(12) United States Patent
Straus

(10) Patent No.: US 7,099,905 B2
(45) Date of Patent: Aug. 29, 2006

(54) NOVELTY CALCULATOR SYSTEM FOR AMUSEMENT

(76) Inventor: Jeffrey G. Straus, 71071 Riverside Dr., Covington, LA (US) 70433

(*) Notice: Subject to any disclaimer, the term of this patent is extended or adjusted under 35 U.S.C. 154(b) by 660 days.

(21) Appl. No.: 10/435,240

(22) Filed: May 10, 2003

(65) Prior Publication Data
US 2004/0225698 A1 Nov. 11, 2004

(51) Int. Cl.
*G06F 19/00* (2006.01)

(52) U.S. Cl. .................... 708/160; 708/131

(58) Field of Classification Search ............. 708/160, 708/131
See application file for complete search history.

(56) References Cited

U.S. PATENT DOCUMENTS

| | | | |
|---|---|---|---|
| 3,538,621 A | 11/1970 | Maveda | |
| 3,813,533 A * | 5/1974 | Cone et al. | 708/111 |
| 3,955,074 A | 5/1976 | Rode et al. | |
| 4,075,771 A | 2/1978 | Landsinger et al. | |
| 4,195,423 A | 4/1980 | Iwao | |
| 4,238,127 A * | 12/1980 | Lucero et al. | 273/143 R |
| 4,295,036 A | 10/1981 | Tsui | |
| 4,307,534 A | 12/1981 | Tomita | |
| D284,017 S | 5/1986 | Smith | |
| 5,984,758 A | 11/1999 | Driska et al. | |
| 6,155,838 A * | 12/2000 | Hyman et al. | 434/322 |
| 6,527,610 B1 * | 3/2003 | Hornsby et al. | 446/175 |
| 2005/0091292 A1 * | 4/2005 | Pai | 708/160 |

* cited by examiner

Primary Examiner—D. H. Malzahn
(74) Attorney, Agent, or Firm—Joseph T Regard, Ltd, plc

(57) ABSTRACT

A novelty calculator and system of input and data manipulation for amusement. The preferred embodiment of the device contemplates a calculator having a body, keyboard for input of numerical data and functions, and a display similar to standard calculators. However, the calculator of the present invention is programmed to provide manipulated, erroneous responses or answers in response to data entered for a humorous or surprising reaction by an observer. The preferred embodiment of the present system includes function controls to provide predetermined manipulation of the of the data for amusement tailored to select themes. For example, a tax function key may be provided which would result in an indication of an inflated amount of taxes due, a stock market function could be provided to indicate exaggerated losses in response to a query, a contractor function could provide an exaggerated or diminished fee for work to be done, or a finance payment function could be provided to indicate an exaggerated or diminished payment amount.

19 Claims, 5 Drawing Sheets

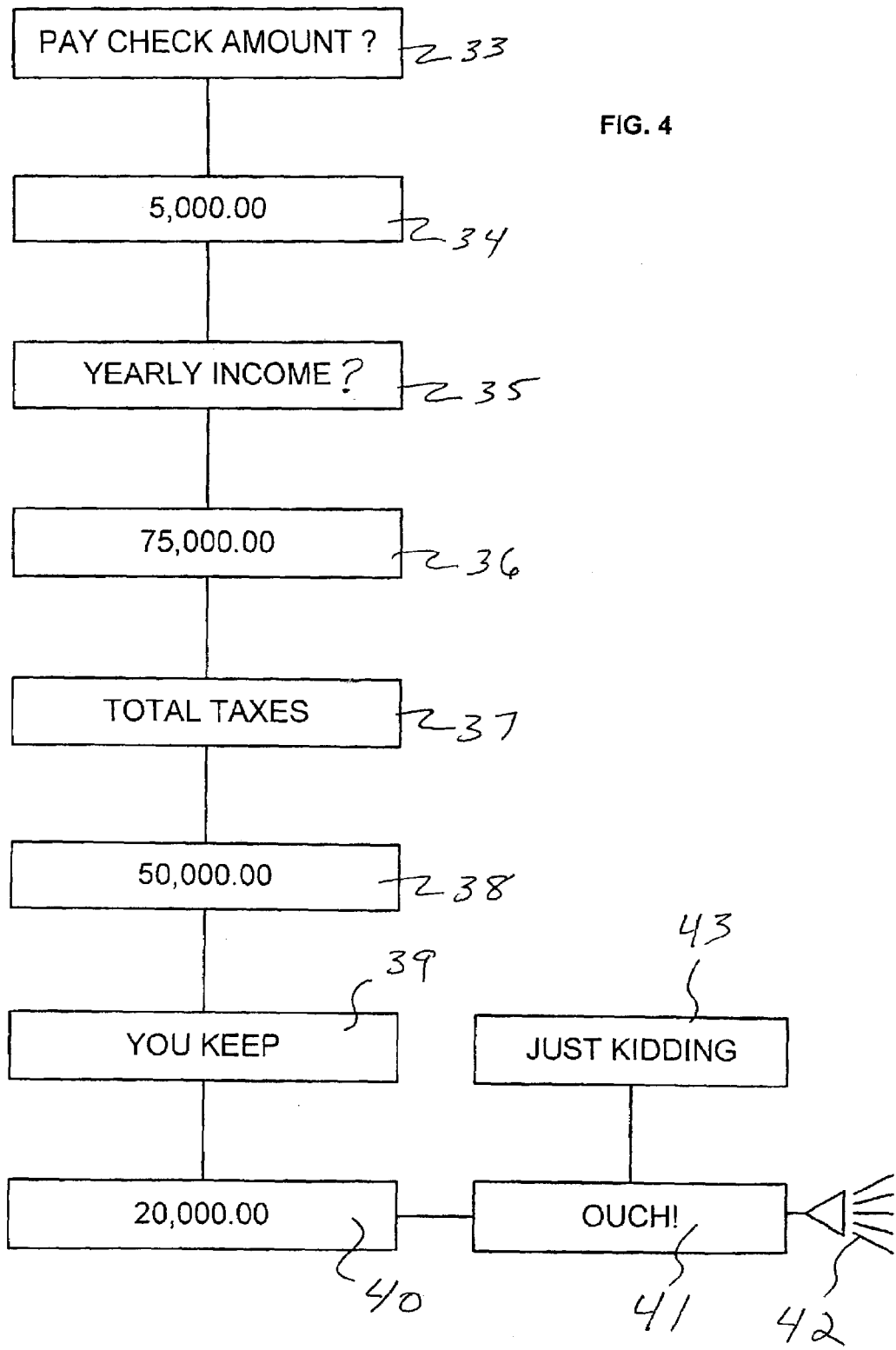

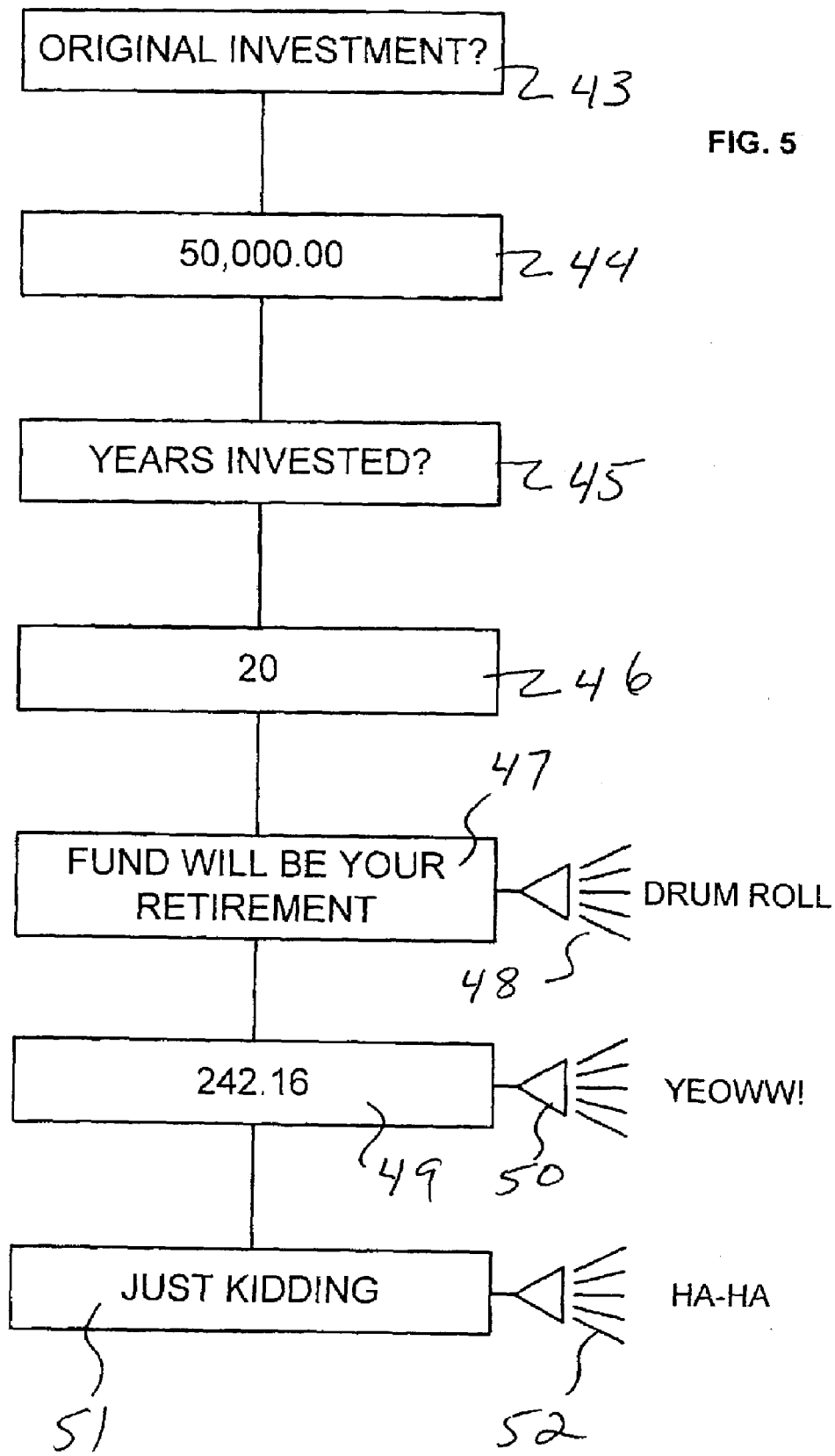

NOVELTY CALCULATOR SYSTEM FOR AMUSEMENT

TECHNICAL FIELD OF THE INVENTION

The present invention relates to devices for amusement, and in particular to a novelty calculator and system of input and data manipulation for producing an amusing result. The preferred embodiment of the device contemplates a calculator having a body, keyboard for input of numerical data and functions, and a display similar to standard calculators. However, the calculator of the present invention is programmed to provide manipulated, erroneous responses or answers in response to data entered for a humorous or surprising reaction by an observer.

The preferred embodiment of the present system includes function controls to provide predetermined manipulation of the of the data for amusement tailored to select themes. For example, a tax function key may be provided which would result in an indication of an inflated amount of taxes due, a stock market function could be provided to indicated exaggerated losses in response to a query, or a contractor function could provide an exaggerated fee for work to be done. The system may be utilized for amusement or as a practical joke.

BACKGROUND OF THE INVENTION

The prior art revealed various patents on calculator and amusement devices, but none as contemplated in the present invention.

Calculators having function keys for specialized operations are not per se new. For example, U.S. Pat No. 3,955,074 to Hewlett-Packard teaches a calculator having programmable keys. Certain simulated calculators or computers for amusement or novelty purposes have also been tried, although not as contemplated in the present invention. See for example U.S. Pat. No. 5,984,758 for a "Simulated Computer" providing user operable keys for selecting a simulated computer function. See also U.S. Pat. No. 4,075,771, U.S. Pat. No. Des 284,017, or U.S. Pat. No. 3,538,621.

Other simulated similar devices are shown in toy cash registers or the like, wherein input of numbers and certain keys may lead to a predetermined result, i.e., a cash drawer opening and auditory signal such as a bell as in U.S. Pat. Nos. 4,295,036, 4,307,534, or 4,195,423.

While the prior art teaches a variety of calculators and related devices, none seem to teach or contemplate a system configured to provide manipulated, erroneous answers for amusing effect as set forth in the invention of the present system.

GENERAL SUMMARY DISCUSSION OF THE INVENTION

The present invention contemplates a novelty calculator which appears to the casual observer as an actual, working, accurate calculator. The calculator may include function keys for specific calculations which would provide a logical query via the display screen wherein the user would input numerical data as requested by the calculator. For example, a tax button may be provided wherein the user is requested to input information relating to amount of pay check and yearly income, whereupon the calculator manipulates the data to provide an exaggerated tax amount for humorous effect or surprise.

Preferably, the erroneous answer is displayed with a secondary indicia such as audio indicating a sound expressing disappointment such as the expression "ouch!", or a crashing sound or some other novelty sound, hinting to the observer that the displayed answer was for amusement; after a period of time, the display indicates that the previous answer was a joke and secondary audio indicia could provide laughter or other sound effect or expression. Optionally, the correct answer could be displayed thereafter, with an indication that said answer is accurate.

In use as a plain calculator for amusement, an unsuspecting user or observer may enter a mathematical sequence such as 2+2=, which sequence is be manipulated via programming means associated with the CPU, and an obviously erroneous answer is displayed for amusement and surprise; secondary audio can be provided for effect.

After a predetermined period of time (for example, 2–5 seconds), the display indicates the answer was for amusement purposes or like message (secondary audio can be emitted for effect), and the correct answer can thereafter be displayed with an indication that said answer is correct. The data manipulation may be via random number generator, which may then be multiplied or divided, or otherwise manipulated as may be determined by the programmer of ordinary skill, or the user.

While the figures of the invention indicate an exemplary keyboard layout including named function keys, it is iterated that the layout, body style, function keys, and logic sequence are for exemplary purposes only, and are not intended to be limiting.

It is therefore an object of the present invention to provide a novelty calculator which provides an erroneous or exaggerated response for amusement.

It is another object of the present invention to provide a novelty calculator which includes secondary audio indicia for effect.

It is still another object of the present invention to provide a novelty calculator which includes function keys for providing predetermined data manipulation for amusement.

It is still another object of the present invention wherein the function keys may include a programmed logical inquiry by the calculator for user input, coupled with data manipulation of the answer tailored to the subject of use, calculated for a surprising or amusing effect.

It is still another object of the present invention to provide a novelty calculator wherein, after the amusing response is indicated, a correct answer is provided with verification that said correct answer is accurate.

Lastly, it is an object of the present invention to provide a novelty calculator which may be programmed by the user to provide amusing answers or responses commensurate with the subject of the calculation.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 4 is a flow chart indicating an exemplary logic sequence of a tax function key on the device of FIG. 1.

FIG. 5 is a flow chart indicating an exemplary logic sequence of a stock market function key on the device of FIG. 1.

DETAILED DISCUSSION OF THE INVENTION

Figure 1:
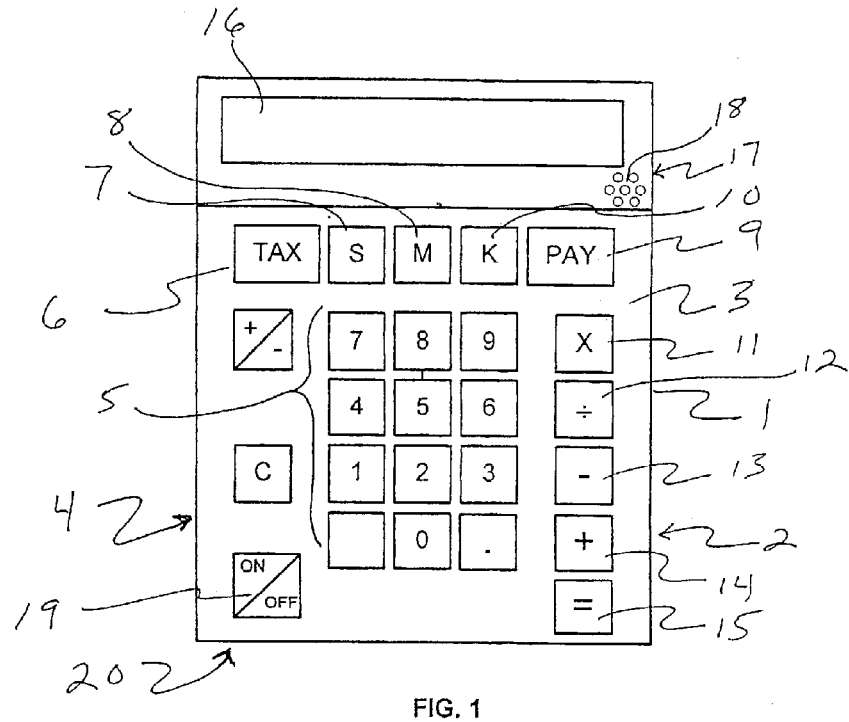
FIG. 1 is a top view of the body, display, and numerical and function keys of the preferred embodiment of the present invention.

Referring to FIG. 1 of the drawings, the calculator 1 of the preferred embodiment of the present invention comprises a body 2 having top 3 and bottom 4 faces, the top 3 face having a numerical input (0–9) key pad 5 for input of numerical data, arithmetic function keys 11, 12, 13, 14 for designating arithmetic functions, and an enter (=) 15 key. Further shown is a display 16 with sound generator 17 having apertures 18 for generating audio, and a power 19 key.

A plurality of various specialized function keys 6, 7, 8, 9, and 10, designating tax, stock market, mortgage, paycheck, and tax functions, respectively, for example, may also be provided, as will be further discussed below.

A switch 20 on the bottom face 4 of the body is provided wherein one may switch the calculator from one or more joke functions, wherein data manipulation is provided, to a regular calculator function, wherein an accurate result is indicated, the novelty mode of operation being bypassed. A further selection on said switch might allow programming of the calculator to provide a desired manipulation of data for surprise, humorous or amusing results, as will be discussed infra.

Continuing with FIGS. 1, 2, and 3A–3D an exemplary mode of use as a novelty calculator would comprise the system having the appearance of and being portrayed as an ordinary calculator with simple arithmetic data and functions inputted therein, and no apparent indication that the device is for amusement discernable from a cursory review of the device itself.

In use as a novelty, gag, practical joke, or amusement device, data such as a math problem 21 may be inputted 22 and initiated pressing the enter (=) 15 key, wherein the data is processed by a CPU 23. In the preferred embodiment of the invention, a correct result 23' stored in memory 24.

As this is a novelty function, a result for amusement is concurrently generated with or without the correct result via data manipulation 25, which amusement answer 27 is displayed 26 for a period of time via timer 28 for user observation, and after a period of time (for example, 3 seconds on the timer), a secondary indicia such as an audio sound or expression 30 may be expressed 31 via sound generator 17, with a concurrent visual indication 29 that the indicated answer was a joke, after which the arithmetically correct answer 23" in memory 24 may be programmed to display, with an indication 32 that said new information is indeed correct.

In the present example, the data manipulation 25 could be by a variety of means, and could alternate via ordinary programming methods. Exemplary means of data manipulation could be random number generation unrelated to the inputted information, a set formula such as multiplication or division of the numerically inputted data by a fixed or randomly generated number, a randomly generated mathematical equation, or other known means of data manipulation which is configured to produce a result in a clearly erroneous in nature and calculated to solicit from the user surprise and/or amusement.

In the above application, the use of the enter(=) key may be programmed to instruct the data manipulation function to manipulate the data via a random number generator or some other function, which can vary depending upon the effect desired to be achieved with the end user. This function may further be programmable via an additional program key on the unit or may be pre-programmed in the system and selectable via the function switch 20.

Figure 2:
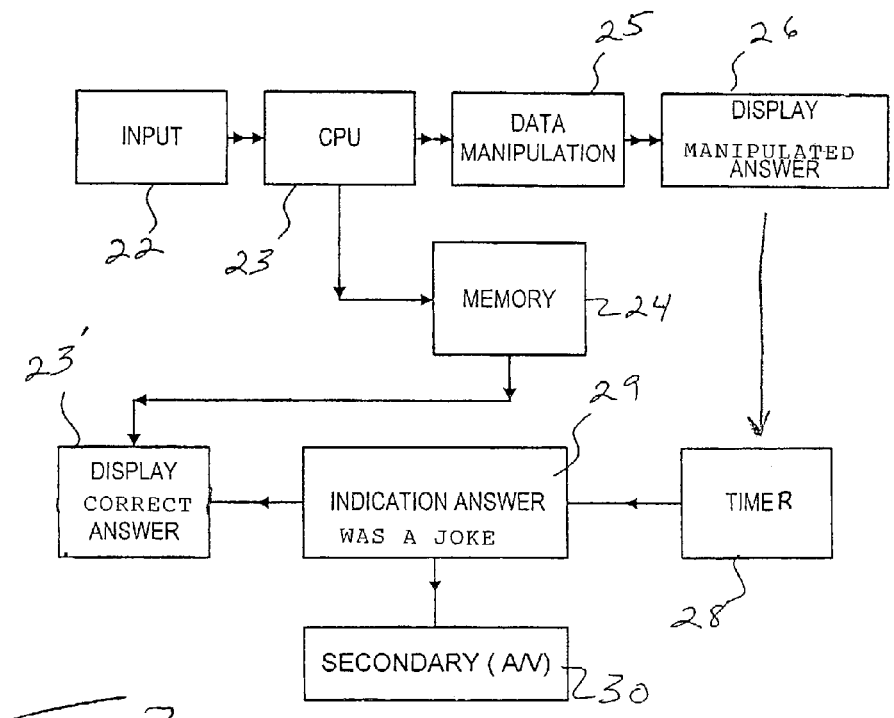
FIG. 2 is a flow chart indicating a query inputted by a user of the device of FIG. 1.
Figure 3A:
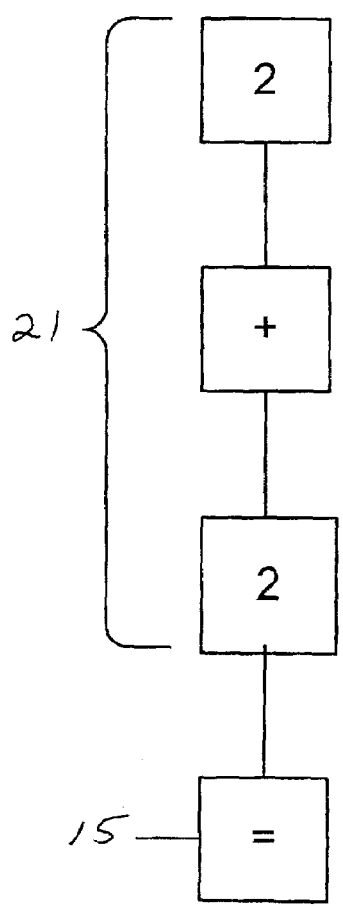
FIG. 3A is a flow chart indicating an exemplary arithmetic input into the device of FIG. 1 by a user.
Figure 3C:
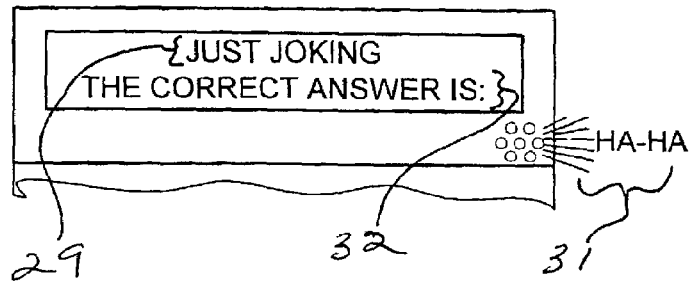
FIG. 3C is a message displayed by the device of FIG. 1 following display of the erroneous answer of FIG. 3A.
Figure 3D:
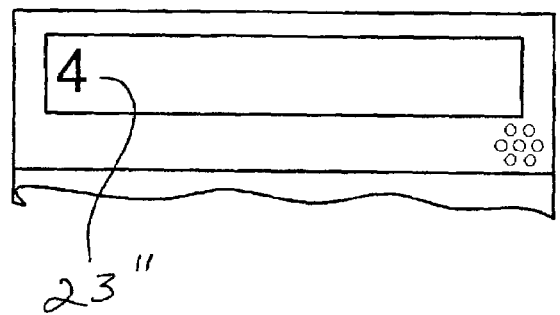
FIG. 3D is the correct answer of the query of FIG. 3A displayed by the device of FIG. 1 following display of the message of 3C.
Figure 3B:
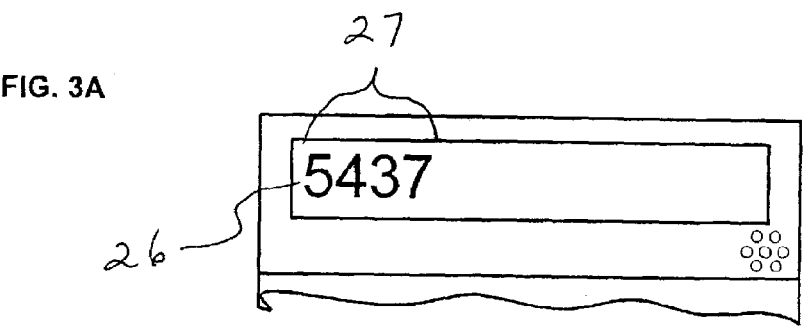
FIG. 3B is an exemplary erroneous answer displayed by the device of FIG. 1 to the query of FIG. 3A.

Continuing with FIGS. 1, 2, and 4, specialized function key 6 may be configured to initiate a tax calculation program wherein the data is manipulated to provide a surprising and amusing result in figuring the users taxes or take home pay.

As shown, upon pressing the tax key 6, the display 16 of the device displays an inquiry as to the amount of the paycheck 33 of the user, whereupon an amount 34 is entered by the user via the numerical key pad, which amount is displayed upon the screen until the user hits the enter (=) button 15. The entered data is then entered into the system, and the device then inquires via the screen the yearly income 35 of the user, which amount 36 is likewise entered into the system, whereupon the device calculates an erroneous answer, which may or may not utilize the inputted data via random number generation or other data manipulation means, thereafter indicating a message as to the forthcoming total taxes 37 to be observed by the user, then displays a clearly erroneous (and exaggerated) figure representing the amount of taxes to be paid 38.

Thereafter, a message 39 indicating how much monies the user will have after taxes 40 will be displayed followed by a visual exclamation such as OUCH! with secondary audio indicia such as a spoken OUCH! 42 via sound generator 17 for a period of time for humorous effect and to suggest to the user the exercise was for amusement and surprise.

After a brief period of time, the display may indicate a message such as "JUST KIDDING" or the like, which may be accompanied by secondary audio indicia via the sound generator, such as "WHEW!" or the like, to alert the user that the preceding was a joke and for amusement purposes only.

Continuing with FIGS. 1, 2, and 5, a second specialized function key 7 may be provided to initiate a stock market calculation program wherein the data is likewise manipulated to provide a surprising and amusing result.

As shown, upon pressing the stock key 7, the display 16 of the device displays an inquiry as to the amount of the original investment 43 of the user, whereupon an amount 44 is entered by the user via the numerical key pad, which amount is indicated via the display until the user hits the enter (=) button 15, whereupon the data is entered into the system.

The device then inquires via a screen message as to the amount of years the money is to be invested 45 by the user, which amount 46 is likewise entered into the system, whereupon the device calculates an erroneous answer utilizing the inputted data via random number generation or other data manipulation means, then indicates that the next figure will represent the funds resulting from the investment 47 to be observed by the user. A secondary audio indicia 48 such as a drum roll may be provided to indicate important information.

An erroneous figure calculated by the device to exaggerate a loss or gain is then indicated 49, the amount further calculated to surprise and amuse; concurrently, secondary audio indicia 50 may be provided to indicate surprise or shock, and for humorous effect.

After a brief period of time, the display may indicate 51 "JUST KIDDING" or the like, which may be accompanied by secondary audio indicia 52 via the sound generator, such as "HA-HA!" or the like, to alert the user that the preceding was a joke and for amusement purposes only.

Figure 6:
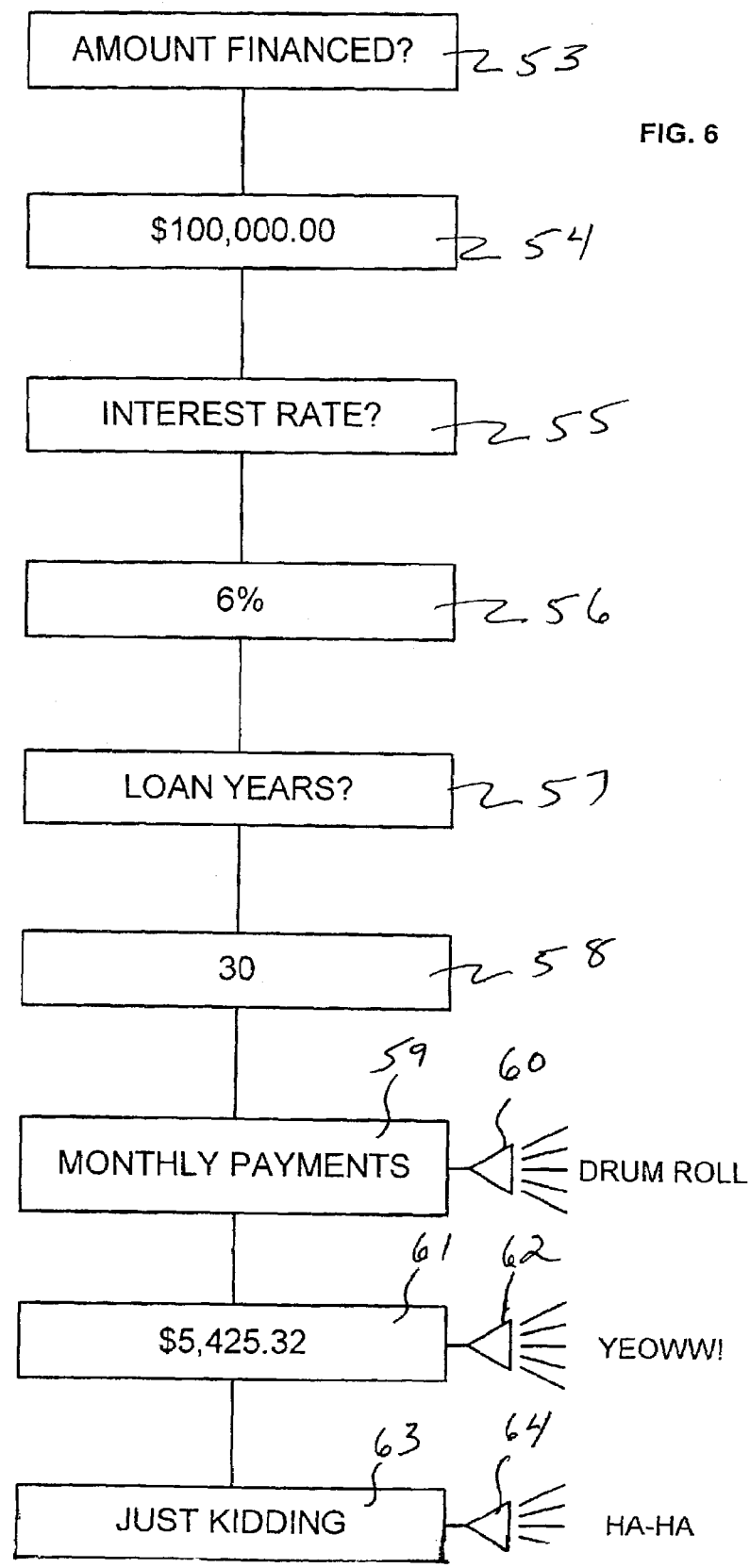
FIG. 6 is a flow chart indicating an exemplary logic sequence of a finance function key of the device of FIG. 1.

Continuing with FIGS. 1, 2, and 6, a third specialized finance function key 9 may be configured to initiate a finance payment calculation program wherein the data is manipulated to provide a surprising and amusing result.

As shown, upon pressing the payment key 9, the display 16 of the device displays an inquiry as to the amount of the amount financed 53 by the user, whereupon an amount 54 is entered by the user via the numerical key pad, which amount is indicated via the display until the user hits the enter (=) button 15, whereupon the data is entered into the system. The device inquires via a message on the screen as to the interest rate 55, which is thereafter entered 56 by the user on the numerical key pad, and the amount of years 57 of the loan, which amount 58 is likewise entered into the system.

With the data entered, the device then calculates an erroneous answer utilizing the inputted data via random number generation or other data manipulation means, then indicates a message indicating that the calculated amount of the monthly payments 59 is to follow. A secondary audio indicia 60 such as a drum roll may be provided to indicate important information is forthcoming, or for suspense.

The erroneous figure calculated to exaggerate a loss or gain is then indicated 61, the amount further calculated to surprise and amuse; concurrently, secondary audio indicia 62 may be provided to indicate surprise or shock, and for humorous effect. A simple manipulation of the data could be, for example, multiplication of the inputted data by a randomly generated number to provide a greatly increased result, or, in the case where a greatly decreased result is desired, division of the inputted data by a randomly generated or fixed number, as desired. Another amusement effect could bypass actual calculation of the inputted data, and not utilizing same, and simply generating a randomly generated number as the answer.

After a brief period of time, the display may indicate 63 "JUST KIDDING" or the like, which may be accompanied by secondary audio indicia 64 via the sound generator, such as "HA-HA!" or the like, to alert the user that the preceding was a joke and for amusement purposes only.

Other specialized function keys such as, for example, a contractor fee calculation key 10 or other specialized calculation may be provided to provide an amusing figure utilizing a similar logic chart to those indicated illustrated above.

A common theme of each of the function keys is that the data is manipulated to provide a clearly erroneous result, and depending upon the function, may be greatly more or less than the anticipated or correct amount. For example, for amusement purposes, in calculating taxes, the tax figure may be much inflated, while a function key relating to the stock market might indicate an erroneous answer which is far less than that the actual, correct result, the answers calculated to shock, surprise, and/or amuse the user or participant.

The present device may be utilized as a gag by providing the device to an unsuspecting third party, who would utilize the calculator in a normal fashion, and be unaware of the novel nature of the device until the user is surprised or amused by the erroneous answer, secondary indicia, and follow up message indicating that the previous response was for amusement and not accurate. Optionally, as discussed, the calculator may then display the correct result.

As also indicated, the present device may alternatively be utilized as a standard calculator via switching the function switch on the back or elsewhere.

Although the present system illustrates the use of numerical input keys, it is iterated that alternative input means, including for example voice recognition, a pointer device, optical character recognition, or other input means may be utilized with the present system satisfactorily.

Further, the utilization of the display screen as the indicator means is for illustrative purposes only, and alternative indicators could be utilized including audio or other means.

In summary, a method of the present invention may be summarized as follows:
 a. providing an amusement device for use by a user, comprising:
  an arithmetic calculator having input means for inputting numerical data, and a display;
  a CPU for calculating an accurate result;
  a memory for storing said accurate result;
  data manipulation means for manipulating the data to provide an erroneous result calculated to surprise;
 b. utilizing said numerical input keys for inputting numerical data;
 c. allowing the CPU to calculate an accurate result;
 d. storing said accurate result in memory;
 e. utilizing said data manipulation means to manipulate said accurate result to provide an erroneous result;
 f. indicating said erroneous result to the user, so as to surprise the user, and
 g. indicating to the user that said erroneous result was not accurate, so as to relieve the user.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. An amusement device for use by a user, comprising:
 an arithmetic calculator having numerical input keys for indicating numerical data, an enter key, and a display;
 a CPU for calculating an accurate result;
 a memory for storing said accurate result;
 data manipulation means for manipulating the data to provide an erroneous result calculated to surprise;
 whereby, upon the user entering numerical data so that the CPU calculates an accurate result and stores same in memory, the data manipulation means manipulates said accurate result to provide an erroneous result which surprises the user, and
 whereby, upon the user having viewed the erroneous result, a message is displayed indicating that said erroneous result was not accurate, so as to relieve the user.

2. The device of claim 1, wherein there is further provided audio indicia associated with the indication of the erroneous result, so as to increase the suspense of the user.

3. The device of claim 2, wherein there is further provided secondary audio indicia associated with the indication that said result was not accurate, so as to relieve the user.

4. The device of claim 3, whereby, following the message having been displayed indicating that said erroneous result was not accurate, said accurate result stored in memory is displayed.

5. The device of claim 4, whereby, upon said accurate result being displayed, a secondary indicia that said accurate result is accurate is communicated to the user, so as to assure the user.

6. An amusement device for use by a user, comprising:
an arithmetic calculator having numerical input keys for indicating numerical data, an enter key, and a display;
message display means associated with said display;
a CPU for calculating an accurate result of an arithmetic sequence entered via said numerical input keys;
a memory for storing said accurate result;
data manipulation means for manipulating the numerical data to provide an erroneous result calculated to surprise, said data manipulation means utilizing said accurate result generated by said CPU as a basis for said manipulation;
a first function key associated with said data manipulation means, said first function key associated with a financial inquiry, said first function key instructing said data manipulation means how said data is to be manipulated so as to elicit surprise by said user;
whereby, upon the user pressing said first function key, numerical data entered by said user is manipulated in a predetermined fashion so as to provide an erroneous result surprises the user, and
whereby, upon the user having viewed the erroneous result, a message is displayed indicating that said erroneous result was not accurate, so as to relieve the user.

7. The amusement device of claim 6, wherein said first function key relates to tax computations, said first function key instructing said data manipulation means to exaggerate any displayed amount of taxes to be owed by the user.

8. The amusement device of claim 6, wherein said first function key relates to stock market computations, whereby said first function key instructs said data manipulation means to manipulate said accurate result and display a lesser amount representing a diminished return on investment.

9. The amusement device of claim 6, wherein said first function key relates to mortgage payment computations, whereby said first function key instructs said data manipulation means to display an inaccurate monthly payment to surprise the user.

10. The amusement device of claim 6, wherein there is further provided audio indicia associated with the indication of the erroneous result, so as to increase the suspense of the user.

11. The device of claim 10, wherein there is further provided secondary audio indicia associated with the indication that said result was not accurate, so as to relieve the user.

12. The device of claim 11, whereby, following the message having been displayed indicating that said erroneous result was not accurate, said accurate result stored in memory is able to be displayed, with an indication that said result is accurate.

13. An amusement device for use by a user, comprising:
a device having the appearance of an arithmetic calculator, said device having input means for entering numerical data, and a display;
a CPU for calculating a result;
data manipulation means associated with said CPU for manipulating data to provide an erroneous result calculated to surprise;
whereby, upon the user entering numerical data, said data manipulation means manipulates said accurate result to provide an erroneous result which surprises the user, and
whereby, upon the user having viewed the erroneous result, a message is displayed indicating that said erroneous result was not accurate, so as to relieve the user.

14. The device of claim 13, wherein there is further provided audio indicia associated with the indication of the erroneous result, so as to increase the suspense of the user.

15. The device of claim 14, wherein there is further provided secondary audio indicia associated with the indication that said result was not accurate, so as to relieve the user.

16. A method of amusement, comprising the steps of:
a. providing a device, comprising:
a device having the appearance of an arithmetic calculator, said device input means for inputting numerical data, and a display;
a CPU for calculating a result;
data manipulation means associated with said CPU for manipulating data to provide an erroneous result calculated to surprise;
b. utilizing said input means to enter numerical data
c. allowing said data manipulation means to manipulate said accurate result to provide an erroneous result;
d. communicating said erroneous result to a user;
e. allowing said erroneous result to surprise the user, and
f. displaying a message indicating that said erroneous result was not accurate, so as to relieve the user.

17. A method of amusement, comprising the steps of:
a. providing an amusement device for use by a user, comprising:
an arithmetic calculator having input means for inputting numerical data, and a display;
a CPU for calculating an accurate result;
a memory for storing said accurate result;
data manipulation means for manipulating the data to provide an erroneous result calculated to surprise;
b. utilizing said numerical input keys for inputting numerical data;
c. allowing the CPU to calculate an accurate result;
d. storing said accurate result in memory;
e. utilizing said data manipulation means to manipulate said accurate result to provide an erroneous result;
f. indicating said erroneous result to the user, so as to surprise the user, and
g. indicating to the user that said erroneous result was not accurate, so as to relieve the user.

18. The method of claim 17, wherein following step "f" there is further provided the step "g" of displaying said accurate result stored in memory.

19. The method of claim 18, wherein in step "g" there is further provided, after the step of displaying the accurate result, the step of communicating to the user that said accurate result is accurate, so as to assure the user.

* * * * *